CALIBRATION OF GAMMA RAY RADIOACTIVE BOREHOLE LOGGING TOOLS

Filed June 6, 1967

INVENTOR.
William C. Pritchett
BY
Attorney

INVENTOR.
William C. Pritchett
BY
Blucher S. Tharp
Attorney

United States Patent Office 3,435,215
Patented Mar. 25, 1969

3,435,215

CALIBRATION OF GAMMA RAY RADIOACTIVE BOREHOLE LOGGING TOOLS

William C. Pritchett, Dallas, Tex., assignor to Atlantic Richfield Company, Philadelphia, Pa., a corporation of Pennsylvania Filed June 6, 1967, Ser. No. 643,934
Int. Cl. G01v *3/18, 13/00*
U.S. Cl. 250—83 6 Claims

ABSTRACT OF THE DISCLOSURE

Calibration of borehole logging tools having a gamma detector. The calibration apparatus includes a neutron source; a target composed of neutron capture material; a housing composed of neutron moderating material; connecting means for attaching the housing to the logging tool; a chamber formed in the housing for the source; and a cavity formed between the connecting means and the chamber for the target. Neutons generated by the source are moderated in the housing to thermal energies and bombard the target. Gammas emitted by the target responsive to the thermalized neutrons are detected by the gamma detector in the tool.

*Background of the invention*

The invention generally pertains to the detection or measurement of radiant energy; more particularly, it is concerned with calibrating radioactive borehole logging tools.

It is generally known in the art to calibrate radioactive well logging instruments. For instance, logging systems of the type where a neutron source and a gamma detector are contained in the logging tool may be calibrated with a standard gamma source positioned externally of the tool. This technique, however, is not fully reliable since the gammas thus obtained do not simulate the wide spectrum of high energy gammas encountered in actual logging operations. Also, few gamma sources are suitable for this purpose so that calibration by this method is somewhat limited in scope.

It has also been proposed to place the logging tool within a body of radiation-interactive material in attempt to simulate the response to the earth formations. The neutron source contained in the tool generates neutrons which interact with the surrounding body of material causing the emission of gammas. Unfortunately, this procedure requires rather bulky and heavy equipment—since both the source and the detector must be contained within the calibration apparatus—which is difficult to handle and use in the field.

An example of calibration apparatus of the latter type is shown in Hall U.S. 3,215,837, patented Nov. 2, 1965. The logging tool to be calibrated is lowered into the bore of a tubular member, i.e. calibration apparatus, containing a plurality of targets of neutron capture material. Neutrons generated by the source are moderated by hydrogenous material contained in the tubular member to thermal energies. The thermalized neutrons interact with the neutron capture material causing gammas to be emitted which are detected by the tool's detector.

At best, such equipment is poorly suited for use in the field. The disclosed calibration apparatus is as long as the logging tool and must be mounted on a large supporting base. It is both difficult to move and set up as attested by the fact that a block-and-tackle arrangement is required to support the sonde in the tubular member.

Moreover, it would be inconvenient and time consuming to change target materials (Hall's device has some 99 cavities which receive as many targets).

*Summary of the invention*

The following definitions are referred to in describing the invention:

"Neutron capture material" is any substance which emits characteristic gammas on interaction with low energy or thermal neutrons.

"Neutron moderating material," is any substance which has a high capacity for moderating or slowing down neutrons to low or thermal energies.

The present invention provides (1) new and simplified calibration apparatus and (2) an improved calibration method for borehole logging tools whose functional components include a neutron source and a gamma detector.

Basically, the calibration apparatus includes a neutron source; a target composed of preselected neutron capture material; a housing composed of neutron moderating material; connecting means for attaching the housing to the logging tool; a chamber formed in the housing adapted to receive the neutron source; and a cavity formed between the connecting means and the chamber adapted to receive the target.

The housing is attached to the logging tool which is to be calibrated with the connecting means; a neutron source is located in the chamber; and a target is placed in the cavity. Neutrons generated by the source are moderated to thermal energies by the neutron moderating material and bombard the target. Gammas emitted by the neutron capture material responsive to the thermalized neutrons are detected by the gamma detector in the logging tool.

Other novel features of the calibration apparatus include neutron absorbers in the housing; an external neutron shield around the housing; channels in the housing leading to the cavity; a gamma shield intermediate to the chamber and the cavity; and a neutron shield between the gamma shield and the housing.

The new method invented by applicant for calibrating a logging tool having a gamma detector may be described as follows:

A neutron source is positioned exterior to the logging tool to be calibrated in a predetermined relation to the gamma detector. A target composed of preselected neutron capture material is placed between the source and the detector. Neutrons generated by the source are moderated to thermal energies. The target is bombarded with the thermalized neutrons. Gammas emitted by the target responsive to the thermalized neutrons are detected with the detector.

The calibration apparatus presented herein has been specially designed for use in the field—it is compact, simply constructed, dependable, rugged and easy to operate. Most important, the present calibration apparatus is considerably smaller and weighs much less than similar prior art devices. Moreover, applicant's device is constructed so that target materials can be changed easily and quickly; the unitary target is simply withdrawn and replaced with another target composed of a different neutron capture material.

*Description of the preferred embodiments*

Figure 1:
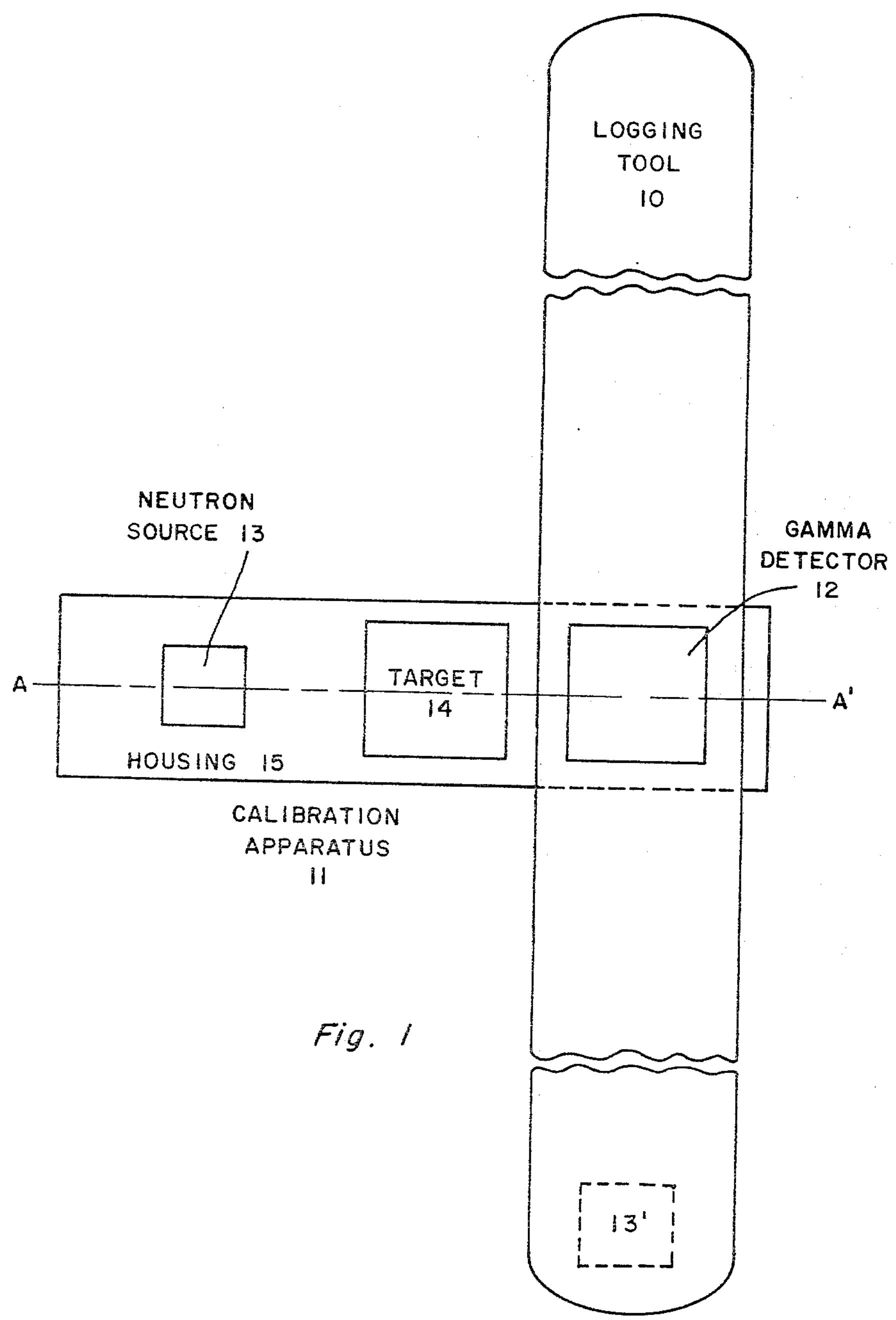
FIGURE 1 shows calibration apparatus according to the invention in operating relation to a logging tool.

FIGURE 1 shows logging tool or sonde 10 and calibration apparatus 11. The former includes gamma detector (scintillator) 12 and the latter includes neutron source 13, target 14, and housing 15. Source 13 is insertable in logging tool 10 as indicated by dashed block 13'.

Calibration apparatus 11 is arranged perpendicular to logging tool 10 with one end of housing 15 positioned in close proximity to gamma detector 12 while the remte end of housing 15 contains neutron source 13. Target 14 lies between source 13 and the end of housing 15 which is connected to logging tool 10.

Neutron source 13 can be plutonium-beryllium, americium-beryllium, radium-beryllium, or any convenient neutron generating means.

Target 14 is composed of neutron capture material chosen so that it contains one or more elements of interest, i.e. an element which is to be logged or one which provides gammas useful for calibration purposes. An element of interest may be present in its elemental form or may be one of the constituents of an organic or inorganic compound so long as the element of interest has a large neutron capture cross-section in relation to other constituents which are present.

The table lists some elements of interest and gives appropriate neutron capture materials.

TABLE

| Element of Interest | Capture Cross-Section, $\sigma$ | Characteristic Gammas, mev. | Neutron Capture Material |
|---|---|---|---|
| Chlorine | 32 | 6.62, 6.12, 5.72 | $C_2Cl_6$ |
| Calcium | 0.43 | 6.42, 4.45, 3.62 | $CaCO_3$, $CaC_2$ |
| Aluminum | 0.23 | 7.72, 1.78 | Al |
| Sodium | 0.53 | 6.41, 5.61 | $Na_2CO_3$ |
| Silicon | 0.13 | 7.18, 6.40, 4.93 | Si |
| Sulfur | 0.49 | 5.43, 4.84 | S |
| Iron | 2.53 | 7.64, 6.02, 5.91 | Fe |
| Potassium | 1.97 | 5.74, 5.66, 5.33 | $K_2CO_3$ |
| Titanium | 5.6 | 6.73, 6.41 | $TiO_2$ |
| Vanadium | 5.1 | 7.15, 6.87, 6.51 | $V_2O_5$ |
| Phosphorus | 0.21 | 6.76, 4.68 | $Mg_2P_2O_7$ |
| Yittrium | 1.27 | 6.07, 4.11 | $Y_2O_3$ |

Housing 15 is composed of neutron moderating material. The best neutron moderators contain hydrogen and/or other elements which have relatively low atomic weights and relatively low neutron capture cross-sections, e.g. carbon, beryllium, and the like. Polyolefins such as polyethylene and polypropylene are preferred neutron moderating materials since they contain both hydrogen and carbon and since they are lightweight, modable, and are easy to machine and mill.

In operation, calibration apparatus 11 is attached to logging tool 10 adjacent to gamma detector 12 and neutron source 13 and target 14 are located in calibration apparatus 11. Neutrons generated by source 13 are moderated to thermal energies by the neutron moderating material comprising housing 15. The thermalized neutrons thus produced bombard target 14 where they interact with the nuclei of the neutron capture material. Gammas emitted by the target nuclei resulting from neutron capture reactions are detected by gamma detector 12.

After completion of the calibration, source 13 is customarily located in block 13' where it is used as the radiation source for sonde 10. Where desired, however, separate neutron sources may be used to calibrate logging tool 10 to and to provide radiant energy for logging operations.

Figure 2:
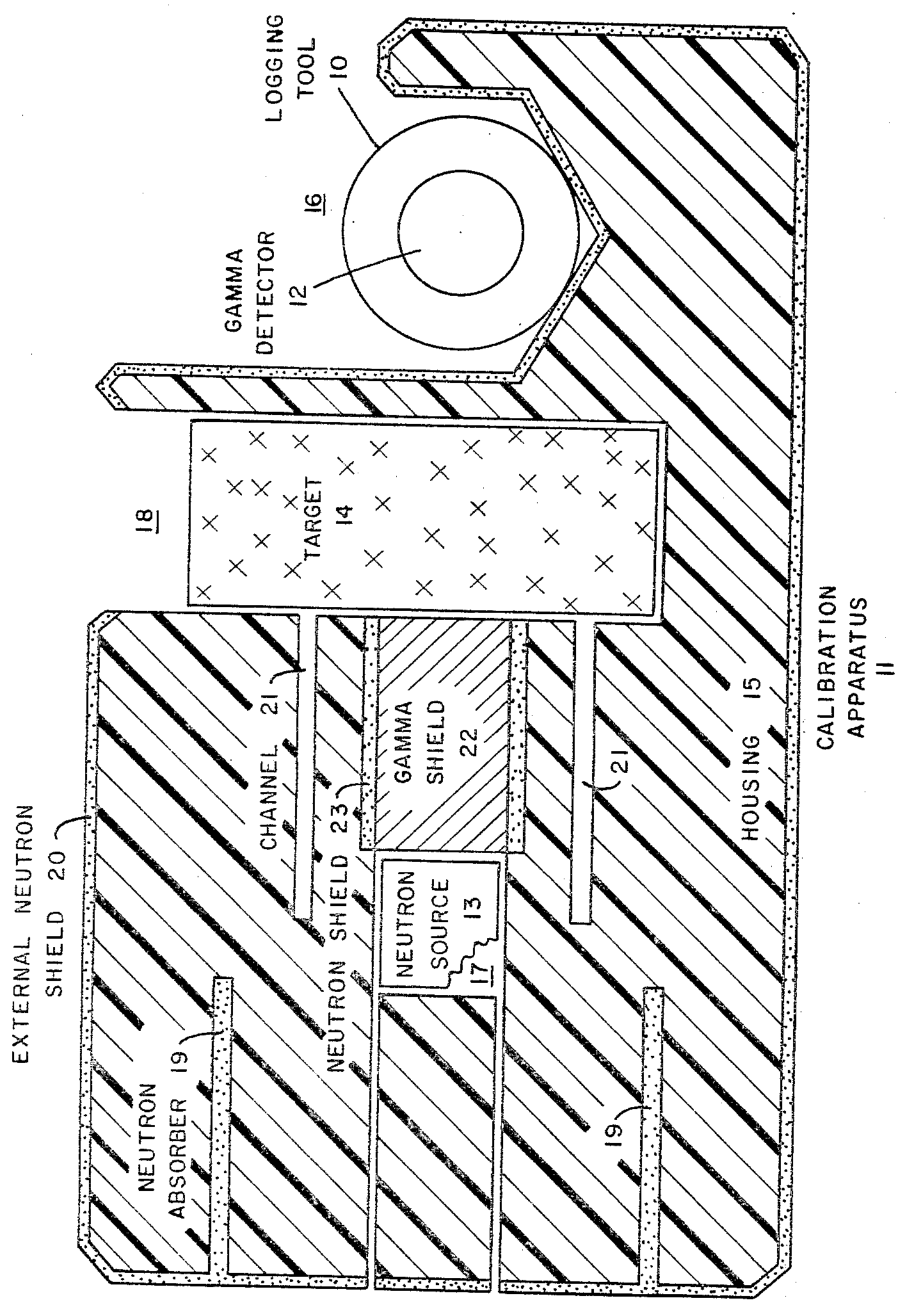
FIGURE 2 is a cross-sectional representation taken along A–A′ in FIGURE 1.

FIGURE 2 provides a cross-sectional view of calibration apparatus 11 showing its detailed construction. Housing 15 is attached to sonde 10 by connecting means. (Connecting means 16 is shown as an indentation; however, it can be a bore, a clamp, or any fastening or holding device). Chamber 17 is adapted to receive source 13 and is located deep within housing 15 so that source 13 will be surrounded by a maximum thickness of neutron moderating material. Target 14 is contained in cavity 18 which is formed between connecting means 16 and chamber 17. Hence, source 13 and target 14, when positioned in chamber 17 and cavity 18, lie along an axis perpendicular to sonde 10 at detector 12.

Other components of calibration apparatus 11 include neutron absorbers 19, external neutron shield 20, channels 21, gamma shield 22, and neutron shield 23. Neutron absorbers 19 are positioned in housing 15 at strategic locations in order to reduce neutron captures by the neutron moderating material. External neutron shield 20 absorbs low energy neutrons which would otherwise escape from housing 15 where they could possibly adversely influence detector 12 by interacting with external materials. Channels 21 act as pathways for neutrons to travel in reaching target 14; they may be empty or contain a material such as carbon. Gamma shield 22 is located intermediate to chamber 17 and cavity 18; its purpose is to attenuate gammas which may be approaching gamma detector 12 from the direction of source 13. (It may be desirable to enlarge gamma shield 22 laterally so that it would shield detector 12 against gammas approaching from housing 15 as well as from gammas approaching directly from source 13.) Neutron shield 23 is located between gamma shield 22 and housing 15, i.e. shield 23 laterally encircles shield 22, in order to absorb thermalized neutrons before they can react with gamma shield 22.

Absorbers 19 and shields 20 and 23 should be comprised of a substance which readily captures neutrons but emits few, if any, gammas with energies greater than 1 mev. Examples of such substances are boron, lithium, and gadolinium. Boron is much preferred for this purpose since it does not emit any gammas over 0.5 mev. (The boron may be present as elemental boron; an alloy or mixture of boron, e.g. boral; or a boron compound, e.g. boron carbide.)

The shielding material comprising gamma shield 22 should be a dense substance which has a high capacity for attenuating gammas such as lead or bismuth.

Other embodiments of the invention are numerous and many of these will be useful in certain applications. Accordingly, applicant intends that the scope of his invention be limited only by the appended claims, after full allowance for equivalents.

What is claimed is:

1. Calibration apparatus for a borehole logging tool having a gamma detector comprising (a) a neutron source, (b) a target composed of preselected neutron capture material, (c) a housing composed of neutron moderating material.

(d) connecting means in said housing for attaching said housing to tool, (e) a chamber formed in said housing adapted to receive said source, (f) a cavity formed between said connecting, (g) a gamma shield is located intermediate to said chamber and said cavity, and (h) a neutron shield is located between said gamma shield and said housing.

2. Calibration apparatus as set forth in claim 1 where said neutron moderating material is a polyolefin.

3. Calibration apparatus as set forth in claim 1 where neutron absorbers are included in said housing.

4. Calibration apparatus as set forth in claim 1 where an external neutron shield is included around at least part of said housing.

5. Calibration apparatus as set forth in claim 1 where channels are provided in said housing leading to said cavity.

6. Calibration apparatus as set forth in claim 1 where said gamma shield is composed of an element selected from the group consisting of lead and bismuth.

References Cited

UNITED STATES PATENTS

| | | | |
|---|---|---|---|
| Re. 24,383 | 10/1957 | McKay | 250—83.3 X |
| 2,769,094 | 10/1956 | Lindor et al. | 250—84.5 X |
| 2,993,994 | 7/1961 | Herzog | 250—83.3 |
| 3,215,837 | 11/1965 | Hall. | |

RALPH G. NILSON, *Primary Examiner.*

MORTON J. FROME, *Assistant Examiner.*

U.S. Cl. X.R.

250—83.3, 84.5